(12) United States Patent  (10) Patent No.: US 6,705,210 B2
Leonard  (45) Date of Patent: Mar. 16, 2004

(54) CHAFING DISH WITH UTILITY HANDLES

(76) Inventor: Joseph L. Leonard, 3217 Mt. Troy Rd., Pittsburgh, PA (US) 15212

(*) Notice: Subject to any disclaimer, the term of this patent is extended or adjusted under 35 U.S.C. 154(b) by 0 days.

(21) Appl. No.: 10/102,197

(22) Filed: Mar. 20, 2002

(65) Prior Publication Data

US 2003/0000396 A1 Jan. 2, 2003

Related U.S. Application Data

(60) Provisional application No. 60/277,320, filed on Mar. 20, 2001.

(51) Int. Cl.$^7$ ................................................ A47J 27/00

(52) U.S. Cl. .............................. 99/413; 99/422; 99/426; 99/449; 220/573.1; 220/573.4; 126/384.1

(58) Field of Search ........................... 99/410, 422, 413, 99/415, 417, 426, 448, 449; 220/4.26, 573.1, 573.4, 912, 574, 657; 126/377.1, 384.1; 219/430, 432, 433, 436, 443.1, 386

(56) References Cited

U.S. PATENT DOCUMENTS

| 925,781 | A | * | 6/1909 | Mathy |
| 2,107,480 | A | * | 2/1938 | Holton ........................ 99/410 |
| 2,588,614 | A | | 3/1952 | Capra et al. |
| 3,112,948 | A | | 12/1963 | Burns |
| 3,179,287 | A | | 4/1965 | Rickmeier, Jr. |
| 3,425,845 | A | * | 2/1969 | Dunn |
| 3,859,505 | A | * | 1/1975 | Herbrand et al. ......... 99/415 X |
| 4,106,486 | A | | 8/1978 | Lee |
| 5,045,672 | A | | 9/1991 | Scott |
| 5,347,979 | A | | 9/1994 | Haber |
| 5,517,903 | A | | 5/1996 | Kaufman |
| 5,676,276 | A | | 10/1997 | Zielinski et al. |
| 6,092,670 | A | * | 7/2000 | Marriott ................... 99/413 X |

* cited by examiner

Primary Examiner—Reginald L. Alexander
(74) Attorney, Agent, or Firm—Blynn L. Shideler; Krissane Shideler; BLK Law Group

(57) ABSTRACT

A chafing dish with utility handles connected to the chafing dish at such an angle as to permit a lid to be placed on top of the chafing dish and allow a safe, efficient, and balanced grip to be had to lift and exchange or serve food in a chafing dish assembly.

20 Claims, 5 Drawing Sheets

CHAFING DISH WITH UTILITY HANDLES

CROSS-REFERENCE TO RELATED APPLICATION

This application claims the benefit of U.S. Provisional Patent Application Ser. No. 60/277,320, filed on Mar. 20, 2001, entitled "Chafing Dish With Utility Handles", which is incorporated herein by reference in its entirety.

BACKGROUND OF THE INVENTION

1. Field of the Invention

The invention relates to the field of catering apparatuses, and in particular to an improved chafing dish which employs handles on the food pan to assist in the exchange of hot chafing dishes, holding of serving utensils and drying of chafing dishes.

2. Background Information

Chafing dishes, also referred to as food pans, steam tables and buffet pans (collectively referred to herein as chafing dishes), are widely used for buffet-type food service, serving various kinds of hot and cold foods. Such chafing dishes typically include a supporting water pan supported by a open frame bracing structure. A heat source may be placed below the water pan to heat the water in the pan. A chafing dish is supported by the water pan, typically above the level of the water. A lid is often provided to cover the chafing dish. Typically, both the deep water pan and the chafing dish will include an outwardly extending peripheral rim at an upper portion thereof. The peripheral rim of the water pan engages the open frame bracing structure to support the water pan. In a similar fashion, the peripheral rim of the chafing dish engages the peripheral rim of the water pan to support the chafing dish. Representative examples of this construction are found in U.S. Pat. Nos. 5,045,672, 5,347,979 and 5,517,903. It is also possible with certain chafing dishes to utilize the chafing dishes and the open frame bracing structure without the intervening water pan, such as for food dishes served and maintained at room temperature. In this assembly, the chafing dish may be supported directly of the open frame bracing structure.

The chafing dishes must be removed from the assembly periodically for various reasons. For instance, chafing dishes must be removed and replaced to replenish the food in the chafing dish assembly, and must be removed to clean the chafing dishes. Chafing dishes must also be configured to provide a seal between the chafing dish and the water pan so that the steam or cold air below the chafing dish will not escape around the edges of the chafing dish.

The prior art chafing dishes are typically constructed with a peripheral rim being either a planar flange having a down-turned outer edge or a planar ledge having an outwardly extending portion which rests on and provides a seal with the water pan in which the chafing dish is placed. Although such chafing dishes may provide an adequate seal so that food placed in the chafing dishes is maintained at a desirable temperature by the steam or cold air therebelow, it is difficult to remove such chafing dishes from the assembly.

To remove the chafing dishes, the edge of the chafing dish, which provides the seal with the water pan, must somehow be lifted from the water pan, by wedging a finger, utensil or other tool under the sealing rim. Such a procedure is difficult and can be dangerous since the chafing dish assembly may have a hot upper surface and/or hot escaping steam which can burn the hand or finger of the person removing the chafing dish.

Commonly, persons removing the chafing dish may unwisely use something else, other than a pot holder, such as an apron that he or she is wearing to remove the chafing dish. This could result in the uneven handling of the chafing dish causing spills and/or burns to the food handler and/or patrons standing nearby while the transfer of hot food is taking place. Furthermore, aprons mistakenly being caught underneath of the chafing dish could quite possibly cause the whole chafing dish assembly to be pulled over.

Attempts have been made to address this problem in the prior art. For example, U.S. Pat. No. 5,676,276 discloses a chafing dish with a notch in the sealing flange to provide a space between the chafing dish and the water pan into which serving utensils can be inserted to lift the chafing dish for easy grasping of the edge of the chafing dish. This solution still requires and encourages the inappropriate use of serving utensils and the like to pry the chafing dish upwards. U.S. Pat. Nos. 3,112,948 and 3,179,287 disclose special attachable chafing dish handles, however, both of these designs require engaging the underside of the sealing flange of a chafing dish with the handles. Consequently, the attachment of the handles to the chafing dishes encounters the same problems associated with moving the chafing dishes without the handles. These handles would also interfere with the sealing of the chafing dish and the water pan and the placement of the lid if the handles were left attached to the chafing dish. Finally, these handles represent another tool which the operator must store separately while the chafing dish assembly is being used, washed or stored. Permanently attached handles have been used in other nested cookware such as draining baskets or strainers as shown in U.S. Pat. Nos. 2,588,614 and 4,106,486.

The strainers have been designed with a peripheral supporting ledge for supporting the strainer within another cooking vessel, typically containing water or oil. Due to the perforated nature of a strainer, the ledge does not form a seal with the underlying cookware. Consequently, removing a strainer from the cookware does not result in a sudden escape of steam as in chafing dish removal. Furthermore, such strainers are not commonly used for food presentation and service.

The conventional prior art chafing dishes are typically stored nested one inside of the other. Suction force makes it difficult to separate such nested chafing dishes. The nested chafing dishes are typically separated by wedging a finger, serving utensil or other tool between chafing dishes.

Such methods of removing chafing dishes from chafing dish assemblies or from one another as stated above are time-consuming, unprofessional in appearance and sometimes dangerous in the fast-paced, high-profile food service industry.

Serving utensils, used with chafing dishes while the chafing dishes are full of food, are usually placed serving-end-in the food being served, while the handle is rested on the end of the chafing dish. Frequently, serving utensils slide or fall into the food requiring food handlers to repeatedly wipe or replace serving utensils after placing fingers into hot food to retrieve the serving utensil. This also is dangerous, time consuming and does not lend itself to a professional appearance.

Thus there is a need for a chafing dish which can easily be removed from a water pan or open frame bracing structure which provides a seal between the chafing dish and the water pan and allows a lid to be placed on top. There is a need for a chafing dish which provides non-suction storage, and provides a suitable place for serving utensils to rest while the chafing dish is in service. There is a need for a chafing dish which allows a safe, efficient and professional-appearing exchange and serving of food.

SUMMARY OF THE INVENTION

The chafing dish according to the present invention solves the difficulties inherent in prior art chafing dishes by providing a chafing dish which can easily be removed from a chafing dish assembly which provides a seal between the chafing dish and the water pan and allows a lid to be placed on top. The chafing dish of the present invention provides non-suction storage for the chafing dishes of the present invention and provides a suitable place for serving utensils to rest within the chafing dish while the chafing dish is in service. The chafing dish of the present invention allows a safe, efficient, and professional-appearing exchange and serving of food, keeping the servers hands away from the outer edge of the chafing dish where hot steam rises from the water pan.

The chafing dishes according to one embodiment of the present invention may have a generally rectangular configuration which includes a solid bottom panel and four solid walls extending upwardly therefrom. The four walls may include first and second end walls and first and second side walls. The end walls are joined to the side walls at curved corners thereof, and define a generally rectangular top opening. A top sealing flange extends outwardly from the four walls around the entire periphery of the walls. The sealing flange has a continuous planar lower surface so that when the chafing dish is placed in a water pan, the continuous planar lower surface is in intimate contact with the upper surface of the water pan around the periphery of the water pan. Thus, the chafing dish is in sealing engagement with the water pan when the chafing dish is placed therein. At least one handle extends inwardly from an inner edge where the end wall or the side wall meets the top ledge. A pair of handles may be provided on opposed sides of the chafing dish for easy handling of the chafing dish. The handles are joined to the inner edge, such as by a screw and washer assembly.

Each handle includes an opening to receive the hands of the user to easily grip the chafing dish and remove the chafing dish from the water pan or the open frame bracing structure. The handles extend inwardly allowing a lid to be placed on top. The handles will space one chafing dish from a nested adjacent chafing dish to provide non-suction storage. The handles also provide a suitable place for serving utensils to rest while the chafing dish is in service. Handles are placed to the inside of the chafing dish to keep hands away from dangerous steam that rises from the water pan when removing the chafing dish from the water pan. Thus the handles on the chafing dishes of the present invention allow a safe, efficient and professional-appearing exchange and serving of food.

Further objects and advantages of the present invention will become apparent from a consideration of the drawings and ensuing description in which like reference numerals represent like elements throughout.

BRIEF DESCRIPTION OF DRAWINGS

In the drawings, to which reference will be made in the specification, similar reference characters have been employed to designate corresponding parts throughout the several views.

DETAILED DESCRIPTION OF PREFERRED EMBODIMENTS

Figure 1:
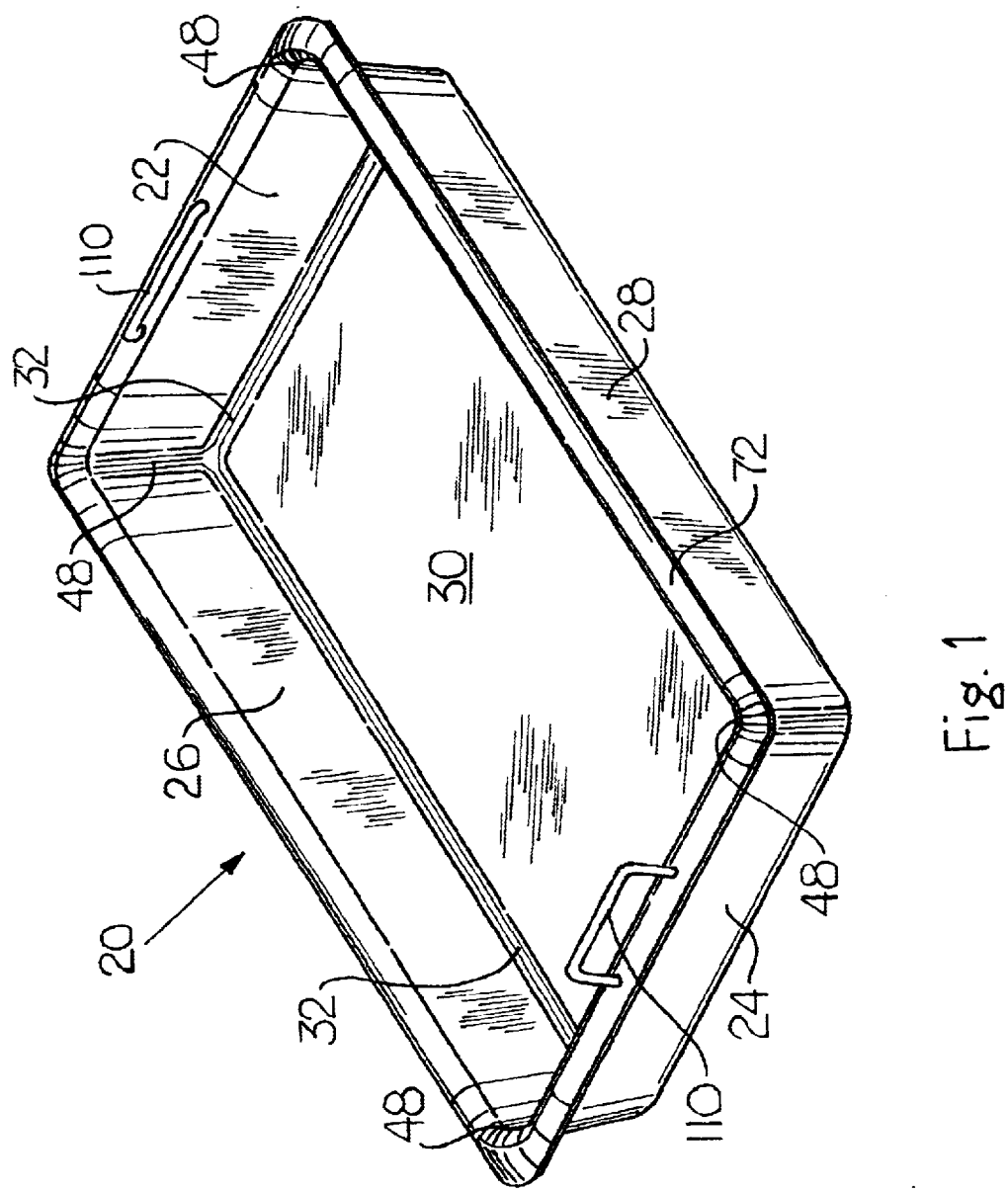
FIG. 1 is a perspective view of a chafing dish according to one embodiment of the present invention.

Referring now to the drawings, FIG. 1 shows an overall view of a chafing dish 20 of the present invention. Chafing dish 20 has first and second opposed ends 22 and 24 respectively, and first and second opposed sides 26 and 28 respectively. Chafing dish 20 comprises a generally rectangular planar bottom panel 30 having the two sides 26 and 28 and the two ends 22 and 24 extending upward therefrom, and a continuous top ledge 72.

Figure 3:
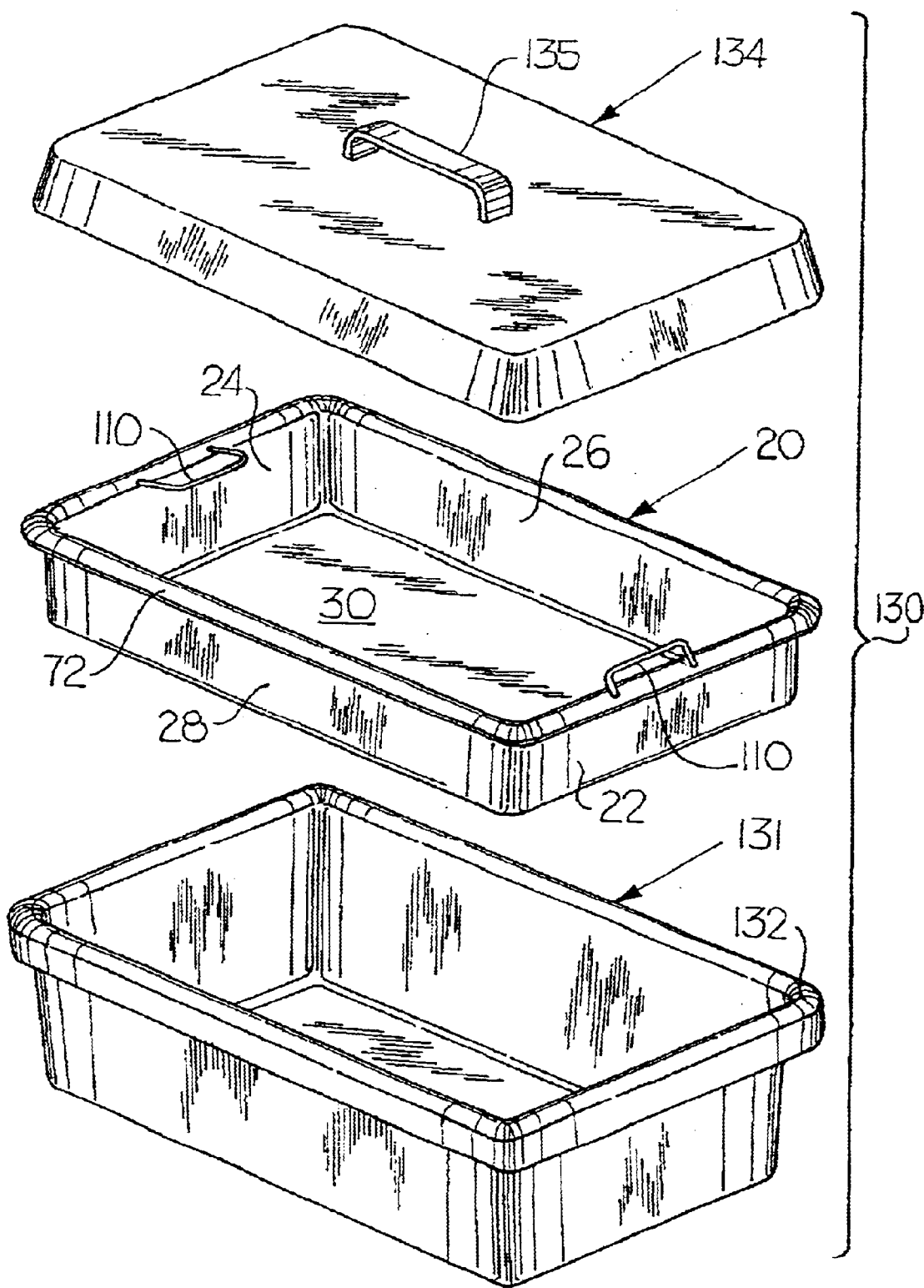
FIG. 3 is an exploded perspective view of the chafing dish illustrated in FIG. 1 within a chafing dish assembly.
Figure 4:
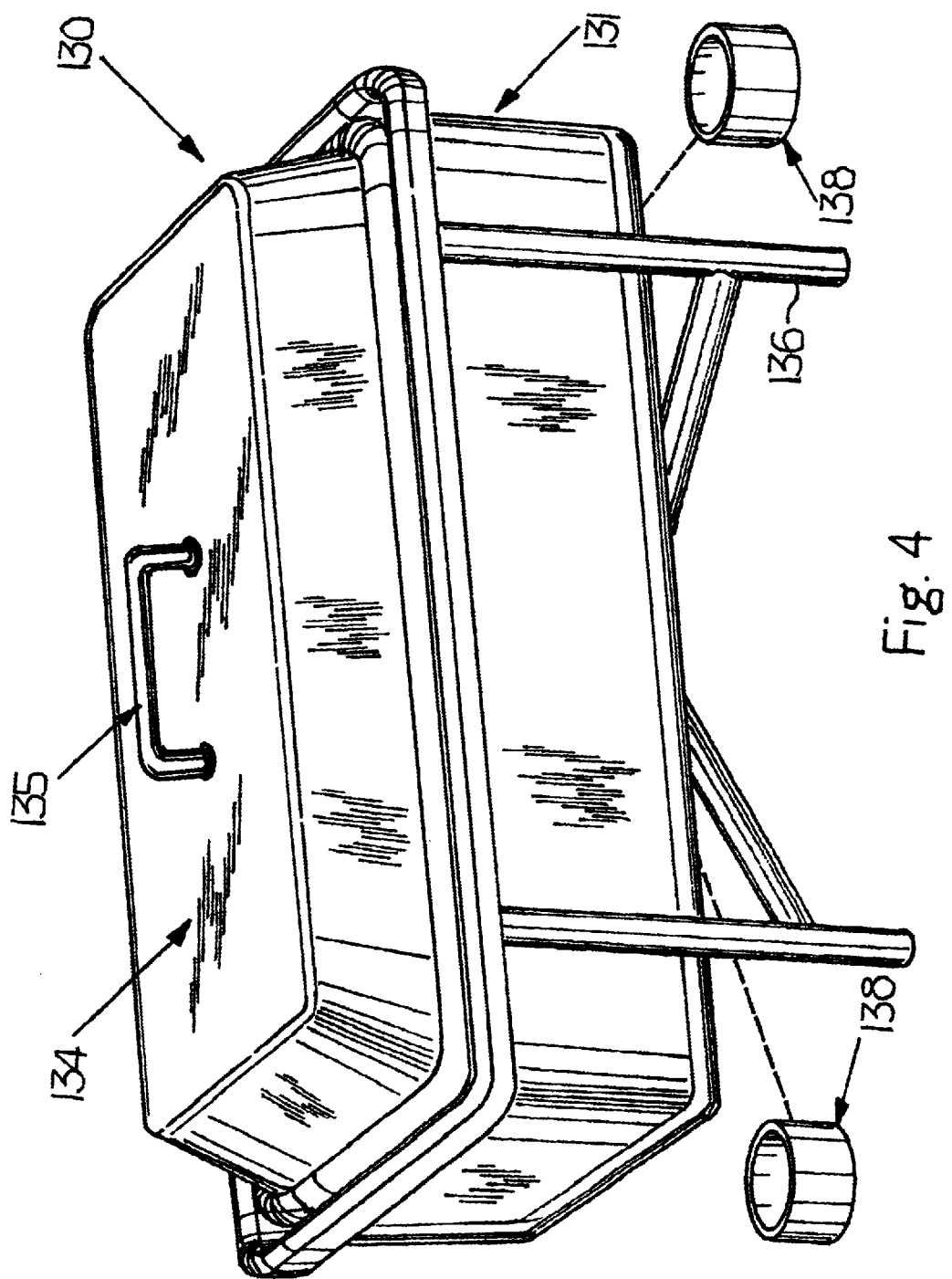
FIG. 4 is a perspective view of the chafing dish assembly of FIG. 3 with an associated stand and burners.

Sides 26 and 28 and ends 22 and 24 are joined to and merged with bottom panel 30 at curved corners 32. Sides 26 and 28 are joined to and merged with ends 22 and 24 at curved corners 48. Sides 26 and 28 and ends 22 and 24 define a top opening and terminate in the top ledge 72. The top ledge 72 extends outwardly from sides 26 and 28 and ends 22 and 24 around the entire periphery thereof and has a continuous planar lower surface so that when chafing dish 20 is placed in a water pan 131 of a chafing dish assembly 130, the top ledge 72 will be in intimate, uninterrupted contact with upper surface 132 of the water pan 131, as schematically shown in FIG. 3. Thus, chafing dish 20 will be in sealing engagement with the water pan 131 when it is located therein. The chafing dish assembly 130 will additionally include the open frame bracing structure 136 and the burners 138 as shown in FIG. 4.

Figure 2:
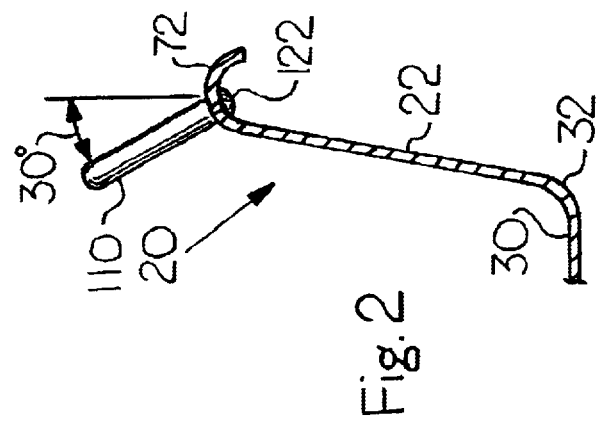
FIG. 2 is a schematic sectional side view of an individual handle of the chafing dish illustrated in FIG. 1.

The top opening is generally rectangular in shape with the exception of the curved corners 48. Chafing dish 20 preferably has two handles 110 located at first and second opposing ends 22 and 24, respectively. The handles 110 may be connected to the top ledge 72 and ends 22 and 24 with fasteners 122, such as #8–32 machine screws. The handles 110 are positioned generally where ends 22 and 24 and top ledge 72 meet, as illustrated in FIG. 2.

End handle 110 comprises left and right upstanding arms which are connected by a horizontal cross bar at curved corners. FIG. 2 illustrates that the handle 110 extends preferably at about a thirty (30) degree inward angle as relative to the ends 22 and 24 to accommodate a lid 134 and has enough width (about 100 mm) between upstanding arms to fit four fingers comfortably. Handle 110 thus allows a firm grip to be had to lift chafing dish 20 from water pan 131. The preferred thirty (30) degree angle of the handles 110 also allows chafing dish 20 to fit into the oven, moves the users hands away from the escaping steam as well as allowing lid 134 to be placed on top of chafing dish 20.

Figures 5, 6:
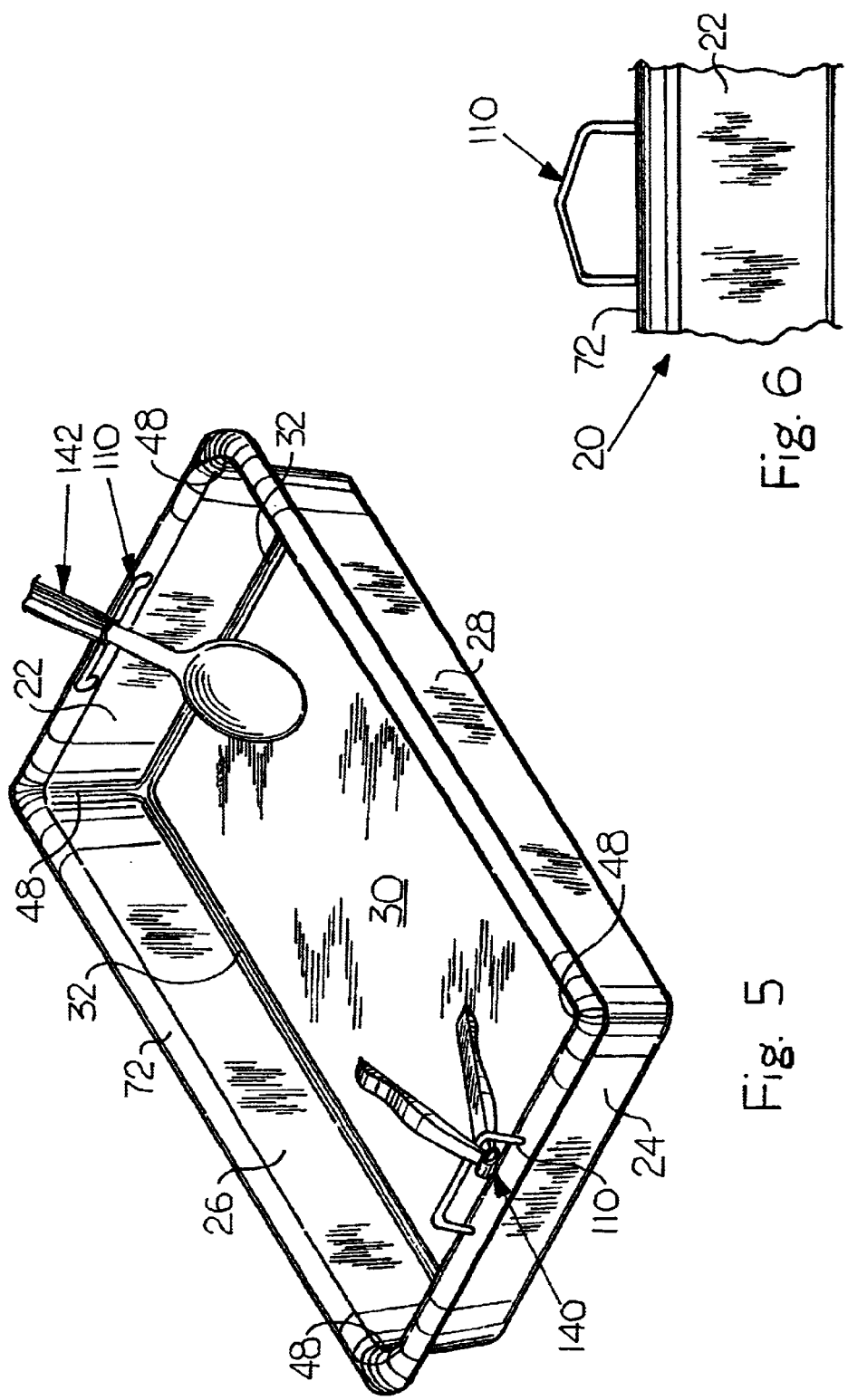
FIG. 5 is a perspective view the chafing dish illustrated in FIG. 1 and serving utensils in a resting position on the handles within the chafing dish.
FIG. 6 is an end view of the chafing dish illustrated in FIG. 1 of the present invention with a bent handle attached.

Hands are placed on handles 110 above chafing dish 20 to lift the chafing dish 20 out from a water pan 131 instead of on the side of the chafing dish as with use of prior art chafing dishes, keeping the hands clear of dangerous rising steam. The inward angle of the handles 110 also lends itself as a ledge, or resting place for a serving spoon 142 or serving tongs 140 to rest securely, minimizing the need for wiping and/or replacing serving utensils as shown in FIG. 5. This is opposed to resting on the ledge of the chafing dish, as in prior art use, where the serving utensil easily slides, handle and all, into the food being served.

Figure 7:
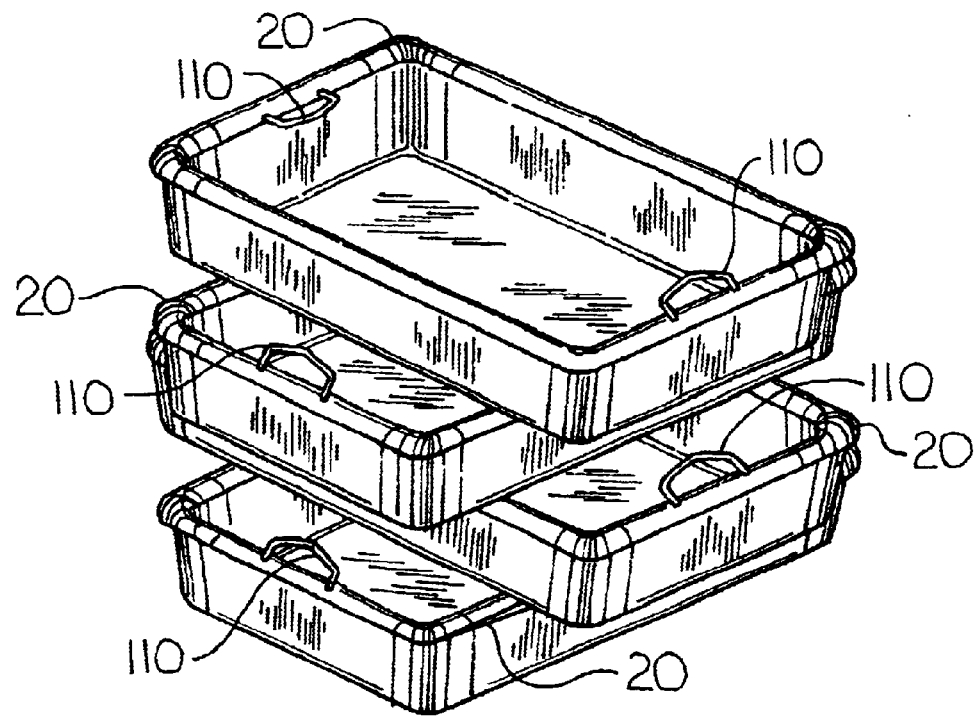
FIG. 7 is a perspective view of stacked chafing dishes of FIG. 6.
Figure 8:
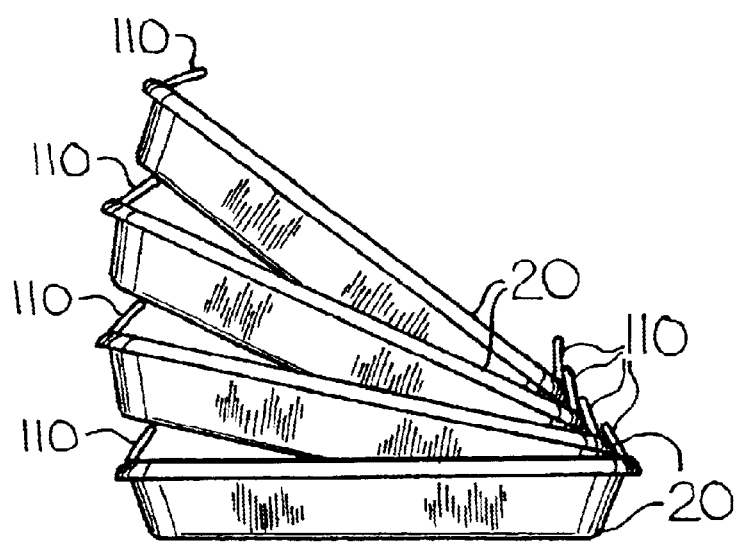
FIG. 8 is a perspective view of nested chafing dishes of FIG. 6.

The handles 110 additionally facilitate the ability to acquire instant access to chafing dishes while being stored since the nesting problems found in the prior art do not exist. Prior art chafing dishes are frequently stacked, or nested, when they are hot and wet and tend to be difficult to separate when they cool. The handles 110 of the chafing dishes 20 provide storage in which nesting problems do not exist as shown in FIGS. 7 and 8. The handles 110 would also allow for hanging storage of the chafing dishes 20 and do not interfere with stacking of chafing dishes as shown in FIGS. 7 and 8.

Color-coded handles 110 could be used to aid in the identification of food in each chafing dish. Prior art chafing dishes offer no such identification. Thus while using color-coded handles 110, interpreting quickly what food is in which chafing dish and how long the food needs to be in the oven, minimizes the constant or prolonged time that the oven must be open to determine such criteria and minimizes the loss of heat from the oven.

FIGS. 6, 7 and 8 show another embodiment where the handles 110 are bent for aesthetic purposes and appeal. Handles 110 may be heat resistant so as to minimize the need for pot holders.

The chafing dish 20 of the present invention solves the difficulties inherent in prior art chafing dishes by providing a chafing dish 20 which can easily be removed from a water pan 131 of a chafing dish assembly 130, keeping hands clear of hot rising steam and which provides a seal between the chafing dish 20 and the water pan 131, and allowing a lid 134 to be placed on top. The permanent inward sloping handles 110 of the chafing dish 20 of the present invention provides non-suction storage, and provides a suitable place for serving utensils to rest while the chafing dish 20 is in service. The chafing dish 20 allows a safe, efficient and professional-appearing exchange and serving of food, keeping hands clear of dangerously hot rising steam.

Chafing dish 20 of the present invention may be formed by drawing a flat rectangular sheet or blank of metal into the desired shape, utilizing, for example, a double-action press, drilling appropriate holes and screwing the handles 110 onto the chafing dish 20. The handles 110 may be attached by other fasteners, such as bolts, or other methods, such as welding or molding the whole chafing dish to include handles as one continuous unit. The handles 110 may be easily retrofitted into existing chafing dishes.

In operation, one first selects the type of chafing dish 20 needed. Size will vary by length or height of sides 26 and 28 and ends 22 and 24. The chafing dish 20 may take other forms than rectangular, such as square, oval or circular. Food to be served is placed in the chafing dish 20 and placed into an oven to be cooked. When using the color-coded handles 110, the cook may choose a system where the color of the handle 110 corresponds with a type of food allowing a quick glance to determine what food is in what chafing dish 20, thereby minimizing the length of time needed for the oven to be open thus minimizing the lost heat which reduces the temperature within the oven.

Once the food is cooked servers are ready to take the food to the chafing dish assembly 130 and place the chafing dishes 20 into the respective water pans 131. The server may use pot holders to lift the chafing dish 20 by holding each of the two handles 110 and placing the chafing dish 20 into the water pan 131. The server may place a lid 134 with handle 135 on top of the chafing dish 20 or may place appropriate serving utensils into the chafing dish 20 on the handles 110 as shown in FIG. 5. For example, a server may rest the handle of serving spoon 142 (as it provides a ledge) on handle 110 of chafing dish 20, or may place serving tongs 140 through handle 110 keeping the utensils accessible to patrons or servers, and minimizing accidental falls of the serving utensils into the food being served.

When the chafing dish 20 is empty of food or otherwise needs replaced, the server simply lifts the chafing dish 20 by the two handles 110 and evenly removes it, although it may still be full of liquid. A second server may be close at hand to replace the empty chafing dish 20 with a full chafing dish 20 of food.

The chafing dishes 20 of the present invention can be made of any suitable material such as metal or polycarbonate or polysulfone material. The handles 110 can be made of any suitable material, including a metal rod having an outer shell of heat resistant color-coded ceramic material. It is also contemplated that the handles 110 could be formed as foldable or collapsible to assist in storage or oven clearance. The handles may be on all or any collections of the sides of the chafing dish 20, even on opposed sides of a circular or oval chafing dish 20. The inward angle, height, width and decorative shape of the handle can also be changed as desired. For example the handle 110 may be as long as the length of a side of the chafing dish 20.

In summary, several advantages are achieved with the present invention. The handles 110 provide an opening in which hands can firmly grip the chafing dish 20 safely and remove it from the chafing dish assembly. The handles 110 of the chafing dishes 20 provide a suitable place for serving utensils to rest while the chafing dish 20 is in service. Serving utensils such as a spoon or tongs rest nicely within the handle 110 itself or leaning against the handle 110. This presents a professional appearance and is more efficient requiring less time to be spent wiping or replacing messy serving utensils by food servers. The handles 110 of this invention provide non-suction storage. While storing the chafing dishes 20 of the present invention by crisscrossing or nesting as shown in FIGS. 7 and 8, easy access to a chafing dish 20 is achieved. The handles 110 allow a safe, efficient and professional-appearing exchange and serving of food, while the use of prior art food pans is dangerous, time-consuming, and unprofessional in appearance when exchanging and serving food in the highly visible and highly competitive food service industry. The handles 110 extend inwardly allowing a lid 134 to be placed on top, and keeping hands away from dangerous steam while lifting the chafing dish 20 from the chafing dish assembly.

It is one advantage that the chafing dish 20 of the present invention reduces the stress in an already stressful occupation. The handles 110 make preparing, exchanging and the overall handling of food safer, more efficient and more professional in appearance than any prior art chafing dishes known. Food servers need only someone to remove the empty chafing dish 20 while they replace it with the full chafing dish 20 of food. Even while using pot holders, a firm grip can be had easily, quickly, simply and safely. Prior art chafing dishes are difficult to separate and cumbersome to exchange food, especially hot food, requiring the use of an additional serving utensil, pot holders, strong arms and a steady hand in the midst of a crowd of hungry guests, to wedge a serving utensil with one hand, using a pot holder with the other hand, to try to get a firm grip on a tiny ledge or gripping device too close to hot steam to remove the chafing dish. A slip of the pot holder, a burn from the steam or an uneven position of food remaining in the chafing dish may cause the server to have any number of a sort of accidents. Consequently, the food server's stress level may be very high trying to cope with all of the uncertainties the prior art chafing dishes present.

Thus the reader will see that the chafing dish 20 of the present invention provides a highly reliable method of cooking, exchanging and serving of food in a safe, efficient, and professional-appearing manner.

The chafing dish 20 of the present invention solves the difficulties inherent in prior art chafing dishes by providing a chafing dish which can easily be removed from a chafing dish assembly, and which provides a seal between the chafing dish 20 and the water pan 131, allowing a lid 134 to be placed on top. The chafing dish 20 of the present invention provides non-suction storage, and provides a suitable place for serving utensils to rest while the chafing dish 20 is in service. The chafing dish 20 of the present invention requires no extended training time to use in a proper and safe manner, and requires no guesswork as to the best way to lift the chafing dish 20 from the chafing dish assembly. The chafing dish 20 of the present invention allows a more balanced firm grip to be acquired before lifting a chafing dish 20 that may be full of liquid.

While my above description contains many specificities, these should not be construed as limitations on the scope of the invention, but rather as an exemplification of embodiments thereof. Many alterations and modifications may be made by those having ordinary skill in the art without departing from the spirit and scope of the invention. Therefore, it must be understood that the illustrated embodiment has been set forth only for the purpose of example and that it should not be taken as limiting the invention.

What is claimed is:

1. A chafing dish comprising:
   a solid bottom panel;
   solid walls extending upwardly from said bottom panel at the peripheral edges thereof, said walls having an upper end and defining a top opening;
   a peripheral ledge extending outwardly from an upper end of said walls, said ledge having a continuous planar sealing lower surface; and
   at least one handle extending inwardly and upwardly said ledge, whereby each said handle may be grasped by a user at a position inward and above said ledge.

2. The chafing dish of claim 1, comprising at least two of said inwardly and upwardly extending handles, one each of said inwardly and upwardly extending handles being located at opposed ends of said chafing dish.

3. The chafing dish of claim 1, wherein four of said walls are provided including a pair of end walls and a pair of side walls, and further including two of said inwardly and upwardly extending handles, one located at opposed ends of said chafing dish.

4. The chafing dish of claim 3, wherein said inwardly and upwardly extending handles extend at an angle about 30° from vertical away from said ledge.

5. The chafing dish of claim 3, further including a lid which rests on said ledge with said inwardly and upwardly extending handles within said lid when said lid is resting on said ledge.

6. The chafing dish of claim 3, further including a water pan wherein an upper ledge of said water pan seals against said ledge forming a water tight seal.

7. The chafing dish of claim 6, further including a lid which rests on said ledge with said inwardly and upwardly extending handles within said lid when said lid is resting on said ledge.

8. A chafing dish assembly comprising:
   a stand;
   a water pan mounted in said stand;
   a chafing dish mounted in said water pan, said chafing dish including,
      a solid bottom panel;
      solid walls extending upwardly from said bottom panel at the peripheral edges thereof, said walls having an upper end and defining a top opening;
      a peripheral ledge extending outwardly from an upper end of said walls, said ledge having a continuous planar sealing lower surface; and
      at least one handle extending inwardly and upwardly from said ledge, whereby each said handle may be grasped by a user at a position inward and above said ledge, and wherein said ledge forms a water tight seal with said water pan.

9. The assembly of claim 8, further including a lid which rests on said ledge with said inwardly and upwardly extending handles within said lid when said lid is resting on said ledge.

10. The assembly of claim 9, wherein four of said walls are provided including a pair of end walls and a pair of side walls, and further including two of said inwardly and upwardly extending handles, one located at opposed ends of said chafing dish.

11. The assembly of claim 10, wherein said inwardly and upwardly extending handles extend at an angle about 30° from vertical away from said ledge.

12. The assembly of claim 11, further including at least one burner beneath said water pan.

13. The assembly of claim 12, wherein each inwardly and upwardly extending handle has a pair of straight arms and a cross bar connecting the arms.

14. The assembly of claim 13, wherein said cross bar of each inwardly and upwardly extending handle is bent.

15. The assembly of claim 12, wherein the each inwardly and upwardly extending handle is color-coded corresponding to the desired contents of the chafing dish.

16. A method of retrofitting a chafing dish comprising the steps of attaching a pair of inwardly and upwardly extending handles to an upper ledge thereof at opposite ends of the dish, wherein the inwardly and upwardly extending handles accommodate a lid on the dish with the inwardly and upwardly extending handles within the area covered by the lid and whereby each said handle may be grasped by a user at a position inward and above the ledge.

17. The method of claim 16, wherein each inwardly and upwardly extending handle has a pair of straight arms and a cross bar connecting the arms.

18. The method of claim 17, wherein the cross bar of each inwardly and upwardly extending handle is bent.

19. The method of claim 17, wherein each inwardly and upwardly extending handle is color-coded corresponding to the desired contents of the chafing dish.

20. The method of claim 17, wherein each handle cross bar is substantially straight.

* * * * *